March 16, 1948.  E. G. HALBY  2,437,737
CLUTCH OPERATING MECHANISM
Filed Sept. 15, 1943  3 Sheets-Sheet 2
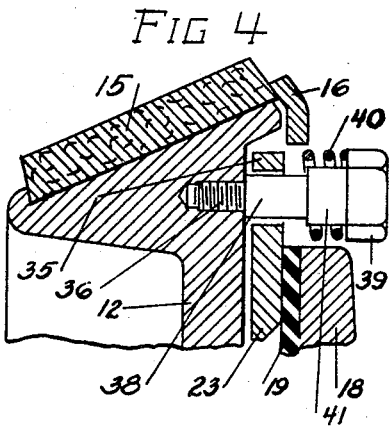
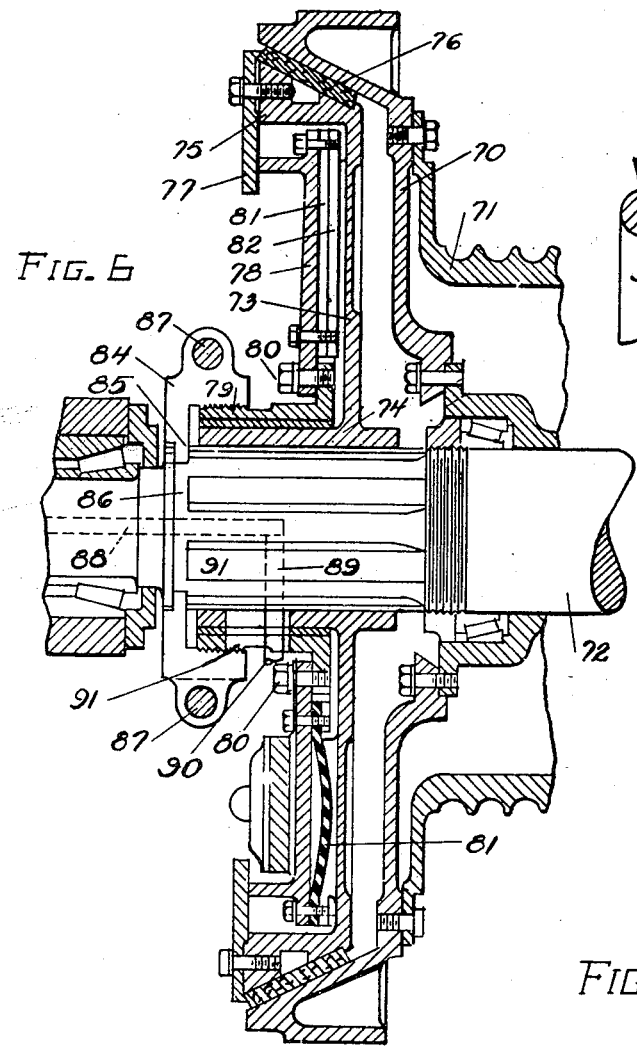
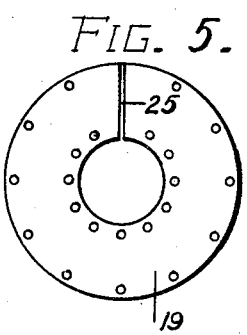
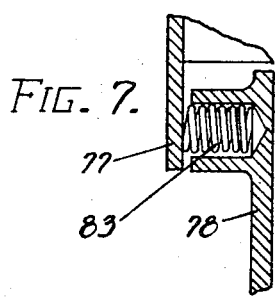
EDWIN G. HALBY
INVENTOR.
BY
ATTORNEY.

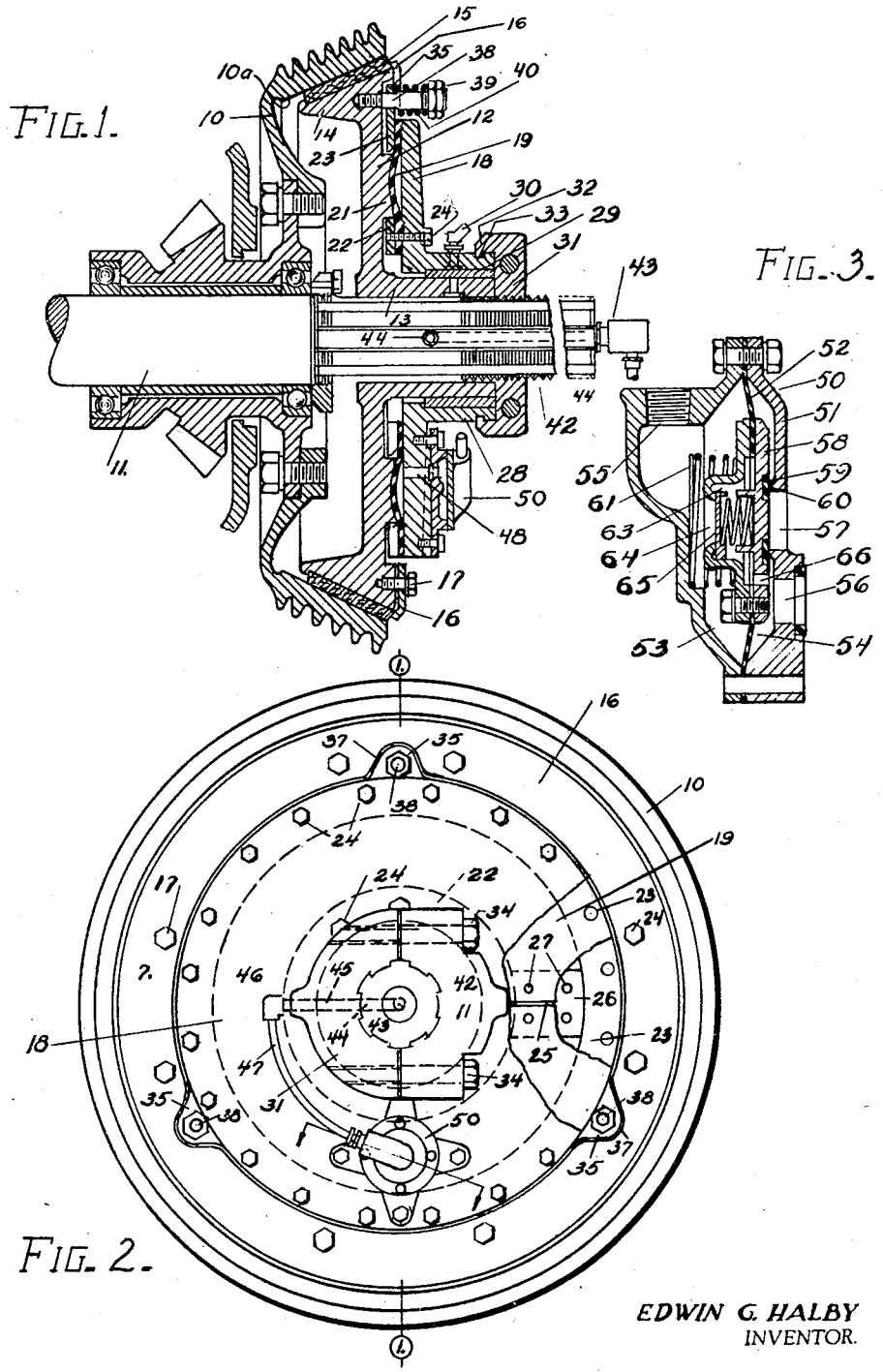

March 16, 1948. E. G. HALBY 2,437,737
CLUTCH OPERATING MECHANISM
Filed Sept. 15, 1943 3 Sheets-Sheet 3

INVENTOR
EDWIN G HALBY
BY
ATTORNEY

Patented Mar. 16, 1948

2,437,737

UNITED STATES PATENT OFFICE 2,437,737

CLUTCH OPERATING MECHANISM

Edwin G. Halby, Marion, Ohio, assignor to Marion Power Shovel Company, a corporation of Ohio Application September 15, 1943, Serial No. 502,475

17 Claims. (Cl. 192—88)

This invention relates to clutch operating mechanism and one object of the invention is to provide simple and efficient fluid operated means for actuating the axially movable member of a friction clutch.

A further object of the invention is to provide such an actuating means which may be applied to a friction clutch without material modification of the construction thereof.

A further object of the invention is to provide such actuating means which may be adjusted to compensate for the wear on the friction element.

A further object of the invention is to provide such actuating means in which a diaphragm is supported exteriorly of the clutch mechanism and arranged to act on the axially movable member thereof.

A further object of the invention is to provide such actuating means with a diaphragm which may be attached to or removed from its supporting structure without removing the latter from the shaft.

Other objects of the invention may appear as the mechanism is described in detail.

Figure 8:
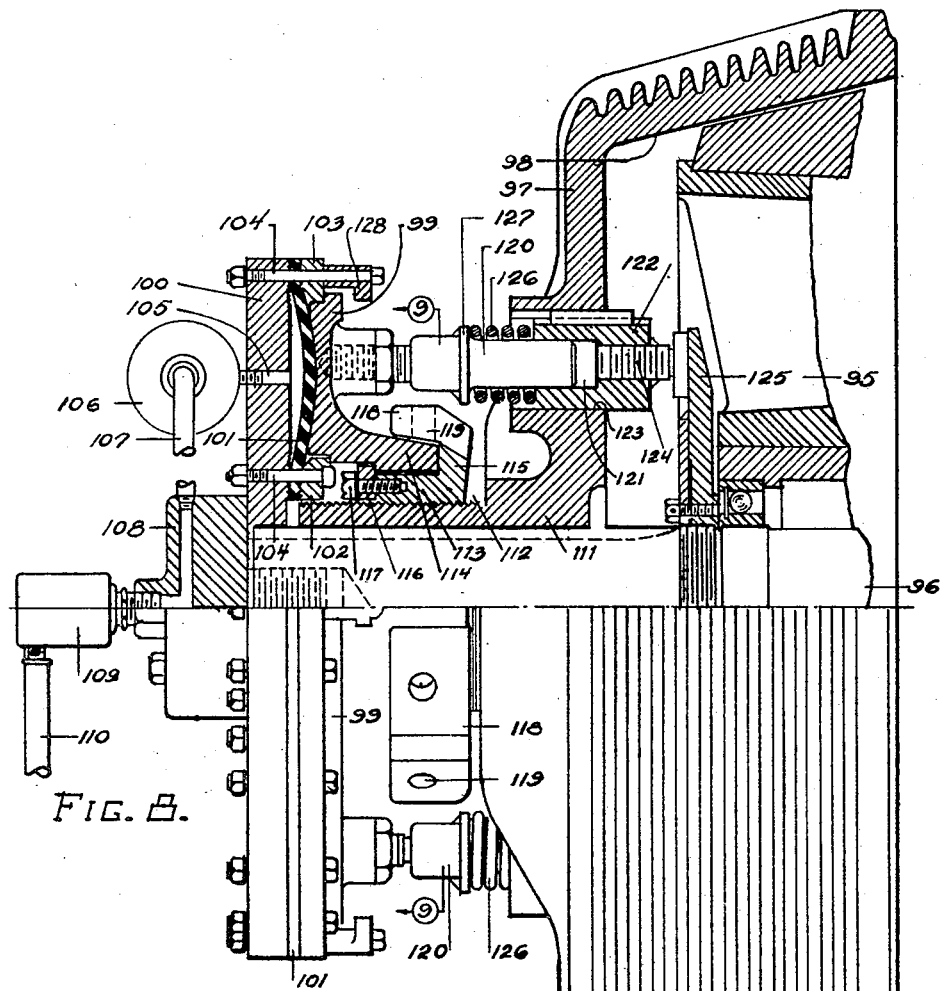
Figure 9:
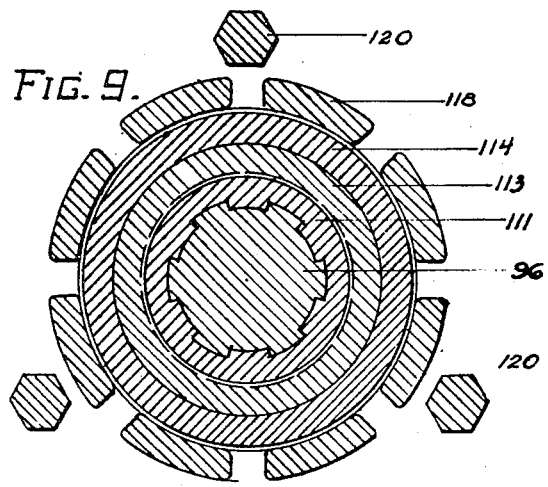

In the accompanying drawings Fig. 1 is a longitudinal sectional view taken centrally through a clutch equipped with the invention, on the line 1—1 of Fig. 2; Fig. 2 is a rear elevation of the clutch, partly broken away; Fig. 3 is a sectional detail view of a quick release valve; Fig. 4 is a detail section of a portion of the movable clutch member showing means for limiting the forward movement thereof and for retracting the same; Fig. 5 is a detail of the diaphragm, on a reduced scale; Fig. 6 is a longitudinal sectional view taken centrally through a slightly modified embodiment of the invention; Fig. 7 is a sectional detail view of one of the spring devices for retracting the movable clutch member of Fig. 6; Fig. 8 is a longitudinal sectional view, partly in elevation, of another embodiment of the invention; and Fig. 9 is a transverse section on the line 9—9 of Fig. 8.

In these drawings I have illustrated certain embodiments of the invention and have shown the same as applied to the driving member of a friction clutch of a type commonly used for heavy work, such as excavating machines and the like, and in which the two clutch members have cooperating frusto-conical friction surfaces. It will be understood, however, that the mechanism may take various forms and may be applied to clutches, brakes or similar devices of various kinds.

In that embodiment here shown the two clutch members are mounted on the same shaft but obviously they could be mounted on separate shafts if desired. The driven member 10 of the clutch is of a known construction having an inner frusto-conical friction surface 10a and is rotatably mounted on a shaft 11 and held against axial movement thereon. The driving member 12 is mounted on the shaft 11 for rotation therewith and for axial movement thereon and, as here shown, it is provided with a rearwardly extending hub 13 splined to the shaft. At its peripheral edge the movable clutch member is provided with a flange 14 to which a friction element 15 is secured by means of a clamping ring 16 and screws 17. Supported about the shaft 11 in the rear of and adjacent to the axially movable clutch member 12 is an annular member 18 which is held normally against axial movement with relation to the shaft 11, but is connected with the clutch member for rotation therewith, the connection being of such a character that the clutch member may have axial movement with relation to the member 18. Interposed between the annular member 18 and the clutch member 12 is a fluid operated device which preferably comprises a fluid distensible element and is here shown as an annular diaphragm 19 of extensible material, such as a suitable rubber or rubber composition, which is rigidly secured at its edges to one of said members and is so arranged with relation to the other member that when subjected to the action of fluid under pressure it will move the clutch member 12 axially into clutching engagement with the driven clutch member 10. Preferably the diaphragm is carried by the annular member 18. It is also preferable that the driving clutch member 12 be provided with a part shaped to engage the intermediate portion of the diaphragm and form a seat therefor and, as shown at 21 in Fig. 1, this part is annular in form and is integral with the driving member. The annular diaphragm is rigidly secured to the annular member 18 at its inner and outer edges in such a manner as to tightly seal the space between the same and the annular member. Preferably this is accomplished by inner and outer clamping rings 22 and 23 applied to the inner face of the edge portions of the diaphragm and rigidly connected with the annular member by screws 24 which are preferably inserted through openings in the annular member from the rear side thereof. For a purpose which will be hereinafter explained the annular diaphragm is preferably severed, as shown at 25, in Figs. 2 and 5, to provide the same with relatively movable ends, and the severed ends are clamped to the annular member 18 by a plate, or plates, 26 attached to the annular member by screws 27.

The annular member may be supported on the shaft 11 in any suitable manner and, in the arrangement shown in Fig. 1, it is provided with a hub 28 extending about the hub 13 of the clutch member 12 and having sliding contact therewith, it being preferably provided with a bushing 29 of suitable bearing material and with a lubricating fitting 30. The annular member may be held against axial movement in various ways, and, as shown in Figs. 1 and 2, a collar 31 is screw threaded onto the shaft 11 and provided with a flange 32 which extends forwardly about the end of the hub 28 of the annular member and has an inwardly extending rib 33 which has a running fit in a circumferential recess in the hub 28. Thus the collar rotates with the shaft but is held normally against axial movement thereon and prevents the axial movement of the annular diaphragm supporting member. Preferably the collar is formed in two parts, as shown in Fig. 2, and the two parts are connected one with the other by screws 34, by means of which they may be clamped tightly to the shaft or may be loosened sufficiently to permit the collar to rotate on the shaft and thus adjust the annular member axially with relation to the shaft. This adjustment is an important feature of the invention because in the use of the clutch the friction element 15 wears away and the movement of the driving member necessary to effect clutching engagement with the driven member increases as the friction element wears away, and eventually becomes so great as to over extend the diaphragm. By means of the adjustable connection between the annular member and the shaft the annular element, diaphragm and driving member may be adjusted lengthwise of the shaft to compensate for the wear on the friction element and the annular member then locked against axial movement.

The annular member 18 may be connected with the driving member 12 for rotation therewith in any suitable manner and in the arrangement shown in Figs. 1, 2 and 4 the outer clamping ring 23 is provided with a plurality of apertured extensions or ears 35, in the present instance three, which extend into and are axially movable in recesses 37 in the ring 16 which clamps the friction element to the driving member. Studs 38 are screwed into or are otherwise rigidly secured to the driving member and project rearwardly through the apertured ears 35 and have their outer ends screw threaded to receive nuts 39, and springs 40 confined between the ears 35 and the nuts 39 act on the latter to retract the driving member after the fluid pressure on the diaphragm has been relieved. Means are also provided to limit the forward movement of the driving member with relation to the annular member and prevent the over extension of the diaphragm and, in the present construction, the studs 38 serve this purpose also. Each stud has the screw threaded forward portion 36, which is secured to the driving member, of a diameter slightly less than the diameter of the intermediate portion thereof, which extends through the apertured ear 35, thus forming a shoulder which engages the driving member and fixes the position of the stud with relation thereto. The outer portion 41 of the stud is of a diameter greater than the diameter of the aperture in the ear, thus forming a shoulder to engage the ear and limit the forward movement of the stud and driving member with relation to the annular member. The studs 38 being rigidly secured to the driving member and extending through parts rigid with the annular member also serve to connect the annular member with the driving member for rotation therewith.

Fuid under pressure, usually air, may be supplied to the diaphragm in any suitable manner. Preferably the shaft is provided with an axial passageway 42 which is connected with a rotary seal 43 which in turn is connected with a conduit 44 leading to a source of fluid supply. The shaft is provided with a radial opening 44 extending from the passageway 42 to the periphery of the shaft and a pipe 45 is connected with the opening 44 and extends through longitudinal slots in the hubs of the driving member and annular member, in the manner shown in Fig. 6. At its outer end the pipe 45 is connected with a conduit 47 which leads to a port 48 in the annular member which communicates with the space between the diaphragm and the annular member.

The means for controlling the supply of fluid under pressure to the diaphragm is usually located at a substantial distance from the clutch itself and as this means may be of any suitable character it is not here illustrated. However, in order to avoid the necessity of the exhaust air traveling reversely through the conduits and sealing member to the source of supply I have provided the clutch with a quick release air valve 50 mounted on the annular member 18. This quick release valve comprises a casing 51 divided by a diaphragm 52 into inlet and outlet chambers 53 and 54. The inlet chamber is provided with a fitting 55 to receive the conduit 47 and the outlet chamber is provided with a port 56 which communicates with the port 48 leading to the diaphragm chamber. The outer chamber is also provided with an exhaust port 57 leading to the atmosphere. Carried by the diaphragm 52 and movable therewith is a valve unit 58 having in one wall thereof a sealing element 59 which is held normally in engagement with a valve seat 60 surrounding the exhaust port 57 by a light spring 61 acting on the valve unit 58, this action being supplemented by fluid pressure. The valve unit has formed therein a valve chamber 63 which is connected by a port 64 with the inlet chamber of the casing 51. The port 64 is normally closed by a spring pressed valve 65 arranged in the chamber 63, which chamber is in open communication with a passageway 66 leading to the outlet chamber 54 and to the port 56. When fluid under pressure is introduced into the inlet chamber 53 the valve unit 58 is pressed tightly against the valve seat 60 to tightly close the exhaust port 57 and the supplemental valve 65 is opened by the fluid pressure, thus permitting the fluid to flow through the chamber 63, passage 66 and port 56 to the diaphragm. When the fluid pressure is interrupted the supplemental valve 65 closes the port 64 so as to completely separate the chambers 53 and 54 and the pressure of the air in the diaphragm chamber and the connecting passages moves the valve unit 58 rearwardly against the action of the spring 61 to open the exhaust valve, thus permitting the fluid to exhaust through the port 56, chamber 54 and port 57 to the atmosphere.

When the diaphragm 19 is a continuous annular structure it can be renewed only by removing the annular diaphragm supporting member from the shaft. Of course a worn diaphragm could be cut and removed but the new diaphragm could not be inserted while the annular member was supported about the shaft. In some cases the removal of the annular member for this purpose would not be a particularly difficult operation but in many instances other clutches or other instrumentalities are mounted on the shaft and in order to remove the annular member it would be necessary to dismantle and remove these other instrumentalities. By splitting the diaphragm and attaching the same to the annular member as above described a worn out diaphragm may be removed by merely screwing the nut 31 back on the shaft to retract the annular member 18 far enough to provide hand room between the annular member and the driving member, it being understood, of course, that nuts 39 on the studs 38 would be removed to permit this retraction of the annular member. It will then be necessary only to remove the screws which connect the clamping rings and plate with the annular member, thereby releasing the diaphragm and permitting it to be removed. The severed ends of a new diaphragm are then separated to permit the latter to be placed about the shaft and the clamping rings and plate are again placed in position and connected with the annular member.

In Fig. 6 we have illustrated a slightly modified form of the apparatus in which the driven clutch member 70 is rigidly secured to and forms a part of a cable drum 71, which is rotatably mounted on a shaft 72. The driving member 73 is similar to the driving member above described and its hub 74 is splined to the shaft 72. The flange 75 which supports the friction element 76 on the driving member projects rearwardly in this instance, instead of forwardly, and the ring 77 which secures the friction element to the flange projects inwardly some distance beyond the flange. The annular member 78 and its hub 79 are formed separately and are rigidly connected one to the other by screws 80, the hub 79 being mounted on the hub 74. The diaphragm 81 is mounted on the annular member in the manner above described, the edge of one end of the diaphragm and the edge of one of the attaching plates being shown respectively at 81 and 82. Springs 83 (Fig. 7) are interposed between the annular member 78 and the ring 77 to retract the driving member. The hub 79 of the annular member is provided with external screw threads to receive a nut or threaded collar 84 which projects rearwardly beyond the hub 79 and is provided with an inwardly extending flange 85 which extends into a circumferential groove 86 in the shaft, thus permitting the nut to be rotated about the shaft but holding the same against axial movement with relation to the shaft. The nut is formed in two parts and is connected by bolts 87 which, when tightened down, clamp the nut tightly onto the threaded portion of the shaft. The shaft has an axial bore 88 forming a fluid conduit and a radial bore 89 with which is connected the pipe 90 which extends through slots 91 in the hubs 74 and 79 and leads to the diaphragm. The operation is substantially identical with that of the device above described.

In Figs. 8 and 9 there is shown another embodiment of the invention in which it is applied to a clutch of the same general type as that above described but in this instance the inner clutch member 95 constitutes the driven member and is rotatably supported on a shaft 96. The driving member of the clutch comprises a part 97 having an inner frusto conical friction surface 98 and a part 99 which is adjustably connected with the part 97 and faces rearwardly from the friction surface 98. This part 99 is annular in form and is opposed to an annular member 100 which is rigidly connected with the shaft 96. Arranged between the members 99 and 100 is a diaphragm 101 which is here shown as secured to the member 100 by clamping rings 102 and 103 and bolts 104. The annular member is provided with one or more fluid passages 105 each of which is connected with a quick release valve 106, which in turn is connected by a pipe 107 with a distributor 108 secured to the annular member 100 and connected through a rotary seal 109 with a fluid supply conduit 110. The two parts of the driving clutch member 97 and 99 may be adjustably connected one with the other in any suitable manner. As here shown, the part 97 has an elongate hub 111 the exterior surface of which is screw threaded at 112. Mounted on this threaded portion of the hub is an internally threaded collar or nut 113 having a cylindrical outer surface on which is supported a hub portion 114 of the annular part 99 of the clutch member. The nut 113 is provided at one end with a radial flange or abutment 115 against which the adjacent edge of the hub 114 abuts and the hub is secured on the nut by a clamping ring 116 which is secured to the nut by screws 117. The flange 115 of the nut is provided with rearwardly extending fingers 118 having apertures 119 to receive a pin or other implement by means of which the nut may be rotated. Thus by loosening the clamping collar the nut may be rotated within the hub 114 of the member 99 and the part 97 of the clutch member adjusted lengthwise of the shaft to compensate for wear on the friction element, and the clamping ring again tightened to rigidly connect the several parts of the driving clutch member one with the other.

Means are provided for retracting the clutch member when the fluid pressure on the diaphragm has been relieved. In the present instance, a plurality of retracting devices are provided and spaced about the axis of the shaft. Each of these retracting devices includes a plunger 120 rigidly secured to the annular part 99 of the clutch member and extending into a bore 121 in one end of a block 122 which is slidably mounted in an opening 123 in the web portion of the part 97 of the clutch member and is held against rotation in that opening. Mounted in the other end of the slide block is a stud 124 which engages an abutment 125 rigidly connected with the shaft to prevent the forward movement of the block 122. A coiled spring 126 is confined between the rear end of the slide block and a collar 127 on the plunger and acts through the slide block, stud and abutment to force the annular member rearwardly and thus move the clutch member as a whole to its inoperative position when the pressure on the diaphragm has been relieved. The movement imparted to the movable clutch member by the diaphragm is limited by a stop 128 secured to the annular member 100 by the outer bolts 104 and arranged in the path of the part 99 of the clutch member.

While I have shown and described certain embodiments of my invention I wish it to be understood that I do not desire to be limited to the details thereof as various modifications may occur to a person skilled in the art.

Having now fully described my invention, what I claim as new and desire to secure by Letters Patent, is:

1. In a clutch of the type comprising a pair of opposed clutch members one of which is adapted to be rotatably mounted on a shaft and held against axial movement thereon and the other of which is adapted to be mounted on said shaft for rotation therewith and for axial movement thereon, said clutch members having cooperating clutching surfaces, at least one of which is of friction material, an annular member having means whereby it may be mounted about said shaft on the outer side of said axially movable clutch member for rotation with said shaft and held against axial movement with relation to said shaft, a fluid operated device carried by said annular member and acting on said axially movable clutch member to move the latter into operative engagement with the opposed clutch member, and means for adjusting said axially movable clutch member toward said opposed clutch member to compensate for the wearing away of said friction material while maintaining the same in operative relation to said fluid operated device.

2. In a clutch of a type comprising a pair of opposed clutch members one of which is adapted to be rotatably mounted on a shaft and held against axial movement thereon and the other of which is adapted to be mounted on said shaft for rotation therewith and for axial movement thereon, said clutch members having cooperating clutch surfaces spaced from said shaft, at least one of said surfaces being of friction material, an annular member having means whereby it may be mounted about said shaft on the outer side of said axially movable clutch member for rotation with said shaft and held against axial movement with relation to said shaft, a fluid distensible element interposed between and in operative relation to said annular member and said axially movable clutch member, means for supplying fluid under pressure to said distensible element to move said axially movable clutch member into clutching engagement with the opposed clutch member, and means for adjusting said annular member and said axially movable clutch member toward said opposed clutch member to compensate for wear on said friction surface.

3. In a clutch of the type comprising a pair of opposed clutch members, one of which is adapted to be rotatably mounted on a shaft and held against axial movement thereon and the other of which is adapted to be mounted on said shaft for rotation therewith and for axial movement thereon, said clutch members having cooperating clutching surfaces spaced from said shaft, at least one of said surfaces being of friction material, an annular member having means whereby it may be mounted about said shaft on the outer side of said axially movable clutch member for rotation with said shaft and held against axial movement with relation to said shaft, said axially movable clutch member having a part spaced axially from said clutching surface thereof and opposed to said annular member, a fluid distensible element interposed between said annular element and said part of said axially movable clutch member, means for supplying fluid under pressure to said distensible element to move said axially movable clutch member into clutching engagement with the opposed clutch member, and an adjustable connection between the two parts of said axially movable clutch member to move the part having said clutching surface toward said opposed clutch member to compensate for wear on said friction surface while retaining the other part thereof in operative relation to said distensible element.

4. In a clutch of the type comprising a pair of opposed clutch members one of which is adapted to be rotatably mounted on a shaft and held against axial movement thereon and the other of which is adapted to be mounted on said shaft for rotation therewith and for axial movement thereon, said members having cooperating clutching surfaces, at least one of said surfaces being of friction material, an annular member having means whereby it may be mounted about said shaft on the outer side of said axially movable clutch member for rotation with said shaft and held against axial movement with relation to said shaft, a fluid distensible element interposed between said annular member and said axially movable clutch member and acting thereon to impart axial movement to said axially movable clutch member, and means for supplying fluid under pressure to said distensible element to distend the same, said axially movable clutch member and said annular member having cooperating parts to prevent excessive distortion of said distensible element as said friction material wears away.

5. In a rotary clutch comprising a clutch member adapted to be mounted on a shaft for axial movement thereon, an annular member connected with said clutch member for rotation therewith and held against axial movement, said members having opposed parts spaced axially one from the other, an annular diaphragm arranged between said opposed parts about the axis of rotation thereof and severed to provide the same with separated end portions, means for detachably securing the inner and outer edge portions and the separated end portions of said diaphragm to one of said members in sealed relation thereto and with its intermediate portion in operative relation to the opposed part of the other member, whereby said diaphragm may be mounted about and removed from said shaft without removing either of said members from said shaft and means for introducing fluid under pressure between said diaphragm and the member to which it is secured.

6. In an operating mechanism for the axially movable member of a rotary clutch, said clutch member having means for mounting the same on a shaft for rotation therewith and for axial movement with relation thereto, an annular member connected with said clutch member for rotation therewith, means for normally holding said annular member against axial movement including a device connected with said shaft and with said annular member, one of said connections being rotatable and the other of said connections being adjustable to impart axial movement to said annular member, and a fluid operated device carried by one of said members and acting on the other member to move said clutch member to clutching position.

7. In a clutch comprising two clutch members having opposed parts to drivingly connect the same one with the other, one of said clutch members having means for mounting the same on a shaft for rotation therewith and for axial movement with relation thereto, and including a rearwardly extending hub, and the other of said clutch members having means for mounting the same for rotation with relation to said shaft about the axis of the latter, an annular member supported on said hub of said axially movable clutch member and connected with the latter for rotation therewith, means for holding said annular member against axial movement with said clutch member, a fluid distensible element supported between said annular member and said axially movable clutch member, and means for subjecting said distensible element to fluid pressure to impart axial movement to said axially movable clutch member.

8. In an operating mechanism for the axially movable member of a rotary clutch, said clutch member having means for mounting the same on a shaft for rotation therewith and for axial movement with relation thereto including a rearwardly extending hub, an annular member connected with said clutch member for rotation therewith and having a hub mounted on and having sliding contact with the hub of said clutch member, a retaining device having means for supporting the same on said shaft in a fixed axial position with relation thereto and for engaging said annular member to hold the latter against axial movement, a fluid distensible element supported between said annular member and said clutch member to actuate the latter, and means for supplying fluid under pressure to said distensible element.

9. In an operating mechanism for the axially movable member of a rotary clutch, said clutch member having means for mounting the same on a shaft for rotation therewith and for axial movement with relation thereto including a rearwardly extending hub, an annular member connected with said clutch member for rotation therewith and having a hub mounted on and having sliding contact with the hub of said clutch member, a retaining device having means for connecting the same with said shaft and with the hub of said annular member to hold the latter normally against axial movement, one of said connections being adjustable to shift said annular member lengthwise of said shaft, a fluid distensible element supported between said annular member and said clutch member to actuate the latter, and means for supplying fluid under pressure to said distensible element.

10 In an operation mechanism for the axially movable member of a rotary clutch, said clutch member having means for mounting the same on a shaft for rotation therewith and for axial movement with relation thereto including a rearwardly extending hub, an annular member connected with said clutch member for rotation therewith and having a hub mounted on and having sliding contact with the hub of said clutch member, a collar having means for connecting the same with said shaft and with the hub of said annular member to hold the latter normally against axial movement. one of said connections being screw threaded to adjust said annular member lengthwise of said shaft, means for clamping said screw threaded connection in an adjusted position, a fluid distensible element supported between said annular member and said clutch member to actuate the latter, and means for supplying fluid under pressure to said fluid distensible element.

11. In an operating mechanism for the axially movable member of a rotary clutch, said clutch member having means for mounting the same on a shaft for rotation therewith and for axial movement with relation thereto including a rearwardly extending hub, an annular member connected with said clutch member for rotation therewith and having a hub mounted on and having sliding contact with the hub of said clutch member, a two part collar having a screw threaded portion to engage said shaft and having rotatable connection with the hub of said annular member, means for connecting the two parts of said collar one with the other and for clamping the same to said shaft, a fluid distensible element supported between said annular member and said clutch member to actuate the latter, and means for supplying fluid under pressure to said distensible element.

12. In an operating mechanism for the axially movable member of a rotary clutch, said clutch member having means for mounting the same on a shaft for rotation therewith and for axial movement with relation thereto and having a rearwardly extending hub, an annular member connected with said clutch member for rotation therewith and having a hub mounted on and having sliding contact with the hub of said clutch member, a two part collar having means whereby it may be rotatably mounted on said shaft and held against axial movement with relation thereto and having screw threaded connection with the hub of said annular member, means for connecting the two parts of said collar one with the other and for clamping the same to said hub of said annular member, a fluid distensible element supported between said supporting member and said clutch member to actuate the latter, and means for supplying fluid under pressure to said distensible element.

13. In a mechanism of the character described, a shaft, a clutch member mounted on said shaft for rotation therewith and for axial movement with relation thereto, an annular member connected with said clutch member for rotation therewith and held against axial movement, a diaphragm arranged between said members and supported by said annular member, said annular member having a fluid passage communicating with the space between the same and said diaphragm, a fluid supply line connecting said passage with a source of fluid under pressure, a relief port connected with said fluid passage, and means controlled by the pressure of fluid from said supply line to close said relief port and controlled by the pressure of fluid in said diaphragm chamber to open said port when the pressure from said supply line is interrupted.

14. In a clutch mechanism, a clutch member having means whereby it may be mounted on a shaft for rotation therewith and for axial movement with relation thereto and comprising a part having a friction surface and an annular part facing rearwardly from and axially adjustable with relation to the first mentioned part, an annular member having means whereby it may be secured to said shaft adjacent to said annular part of said clutch member, a fluid distensible element interposed between said members and arranged to act on said annular part of said clutch member to impart axial movement to the latter, means for supplying fluid under pressure to said distensible element, and means for relatively adjusting the two parts of said clutch member to vary the distance between said friction surface and said annular part.

15. In a clutch mechanism, a clutch member having means whereby it may be mounted on a shaft for rotation therewith and for axial movement with relation thereto and comprising a part having a friction surface and an annular part facing rearwardly from the first mentioned part, an annular member having means whereby it may be secured to said shaft adjacent to said annular part of said clutch member, a fluid distensible element interposed between said member and arranged to act on said annular part of said clutch member to impart axial movement to the latter, means for supplying fluid under pressure to said distensible element, and spring means acting on a part fixed with relation to said shaft and on said clutch member to retract the latter.

16. In a clutch of the type comprising a pair of opposed clutch members, one of which is adapted to be rotatably mounted on a shaft and held against axial movement thereon and the other of which is adapted to be mounted on said shaft for rotation therewith and for axial movement thereon, said clutch members having cooperating clutching surfaces spaced from said shaft, an annular member connected with said axially movable clutch member for rotation therewith and held normally against axial movement therewith, said axially movable clutch member and said annular member having opposed surfaces spaced axially one from the other, a fluid distensible element arranged between said opposed surfaces of said members, and means for supplying fluid under pressure to said distensible element to cause the latter to impart axial movement to said clutch member, said connection between said members being independent of said fluid distensible element.

17. In a clutch mechanism, a clutch member adapted to be mounted on a shaft for rotation therewith and for axial movement with relation thereto, and also comprising a part having a friction surface and an intermediate rearwardly facing annular part, a second clutch member adapted to be mounted for rotation about the axis of said shaft with relation thereto, held against axial movement and having a friction surface opposed to the first-mentioned friction surface, an annular member having means whereby it may be supported about said shaft in the rear of said rearwardly facing part of said axially movable clutch member and held against axial movement with relation to said shaft, a fluid distensible element interposed between said axially movable clutch member and said annular member and arranged to act on said annular part of said axially movable clutch member to move the friction surface of the latter into clutching engagement with the friction surface of said second clutch member, means separate from said fluid distensible element for connecting said annular member with said axially movable clutch member for rotation therewith, and means for supplying fluid under pressure to said distensible element.

EDWIN G. HALBY.

REFERENCES CITED

The following references are of record in the file of this patent:

UNITED STATES PATENTS

| Number | Name | Date |
| --- | --- | --- |
| 847,575 | Hanson | Mar. 19, 1907 |
| 993,825 | Cramer | May 30, 1911 |
| 1,900,448 | King | Mar. 7, 1933 |
| 1,942,489 | Pfefferle | Jan. 9, 1934 |
| 2,025,635 | Bishoff | Dec. 24, 1935 |
| 2,278,068 | Fawick | Mar. 31, 1942 |
| 2,370,360 | McLean et al. | Feb. 27, 1945 |
| 2,395,239 | White et al. | Feb. 19, 1946 |